June 23, 1942.   F. CARTLIDGE   2,287,230
CUTTING AND LOADING MACHINE
Filed Jan. 11, 1941   5 Sheets-Sheet 1
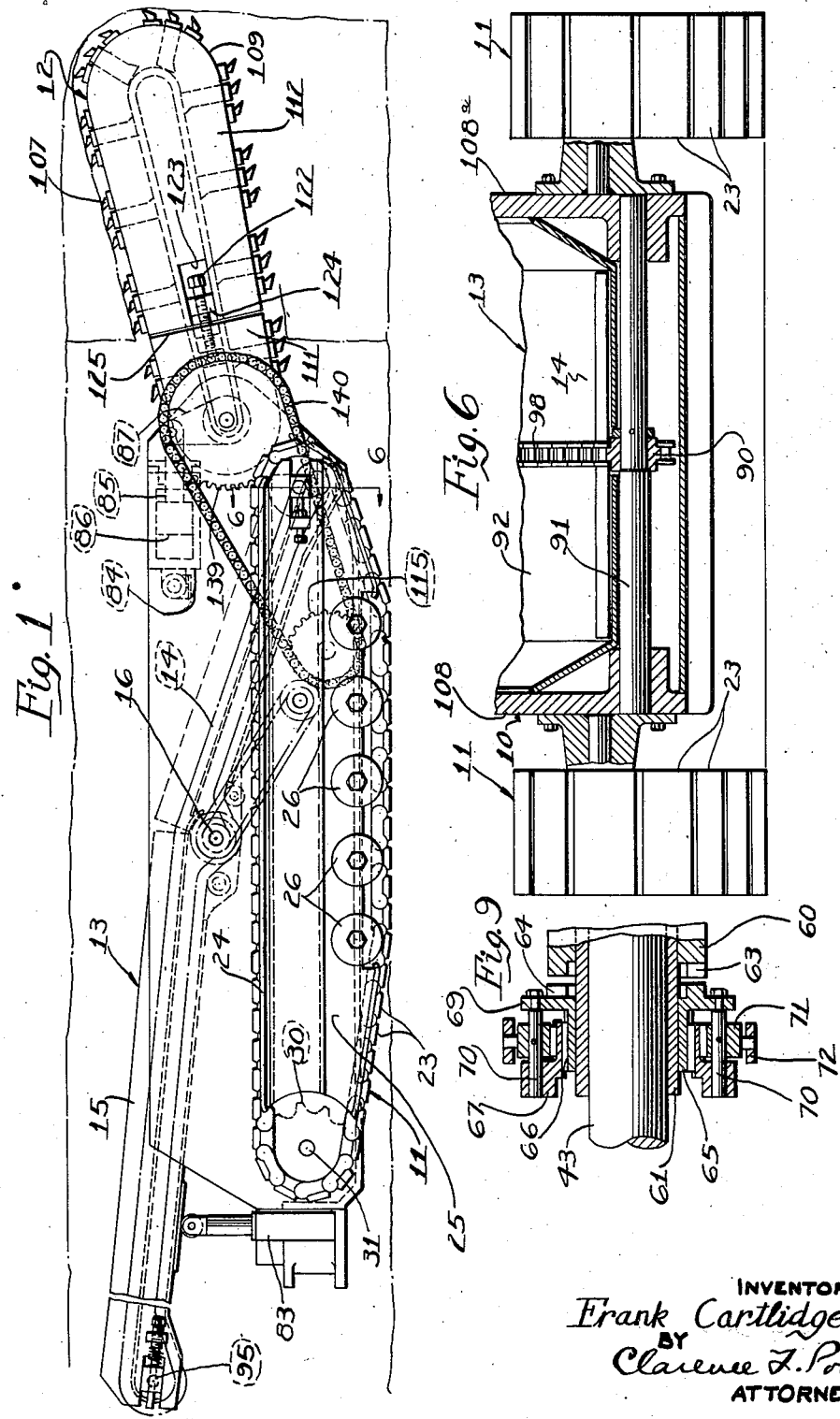
INVENTOR
Frank Cartlidge
BY
Clarence F. Poole
ATTORNEY

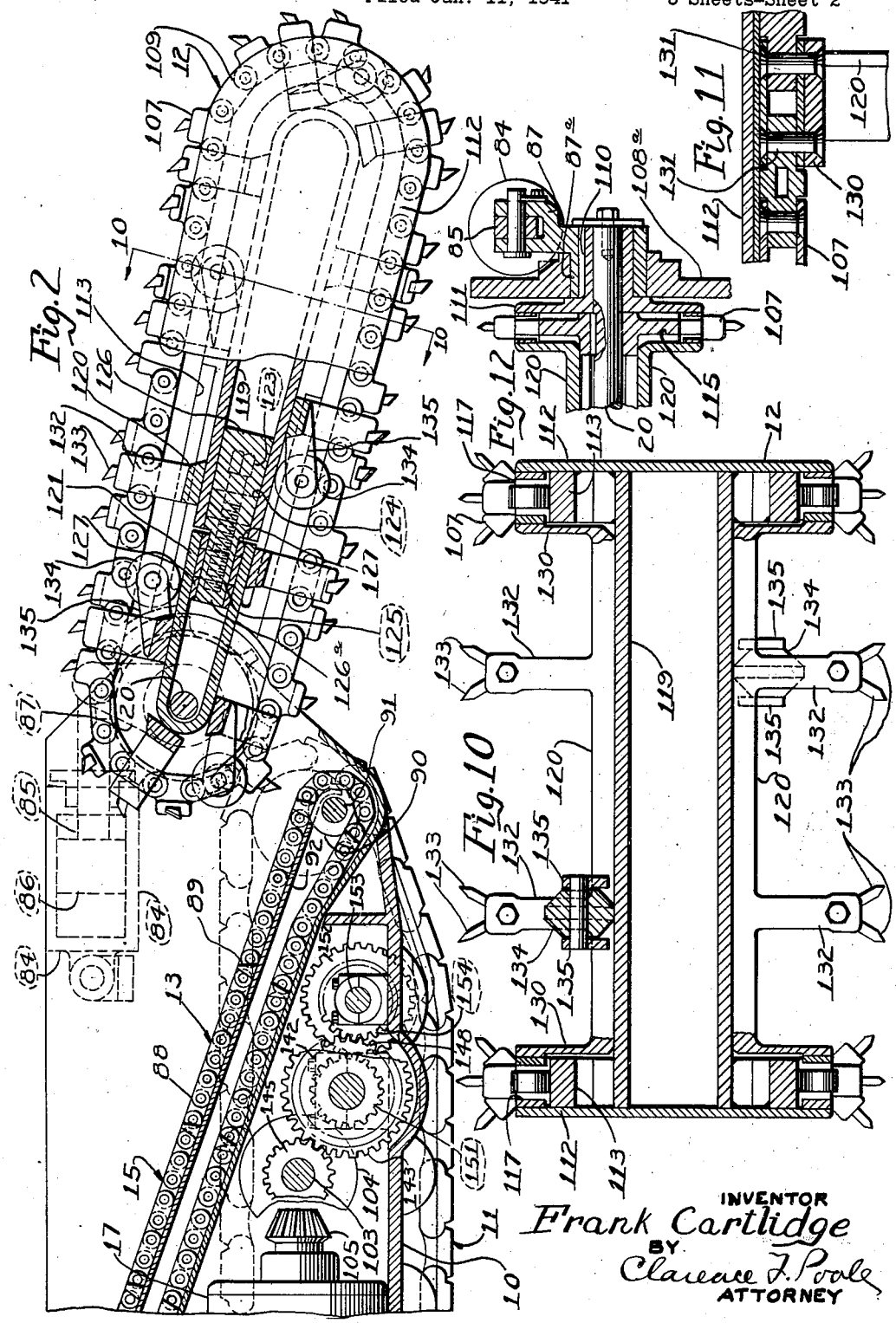

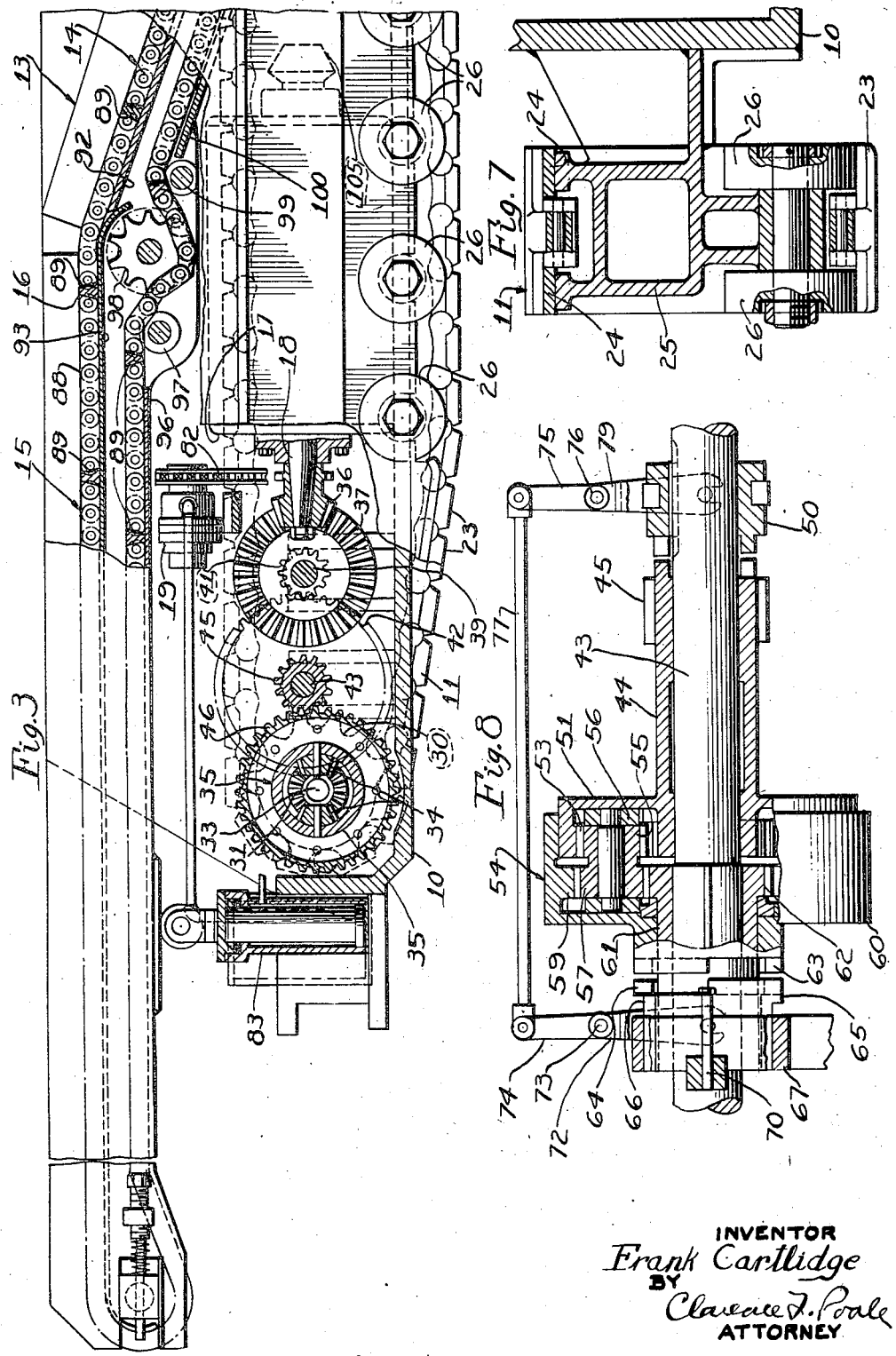

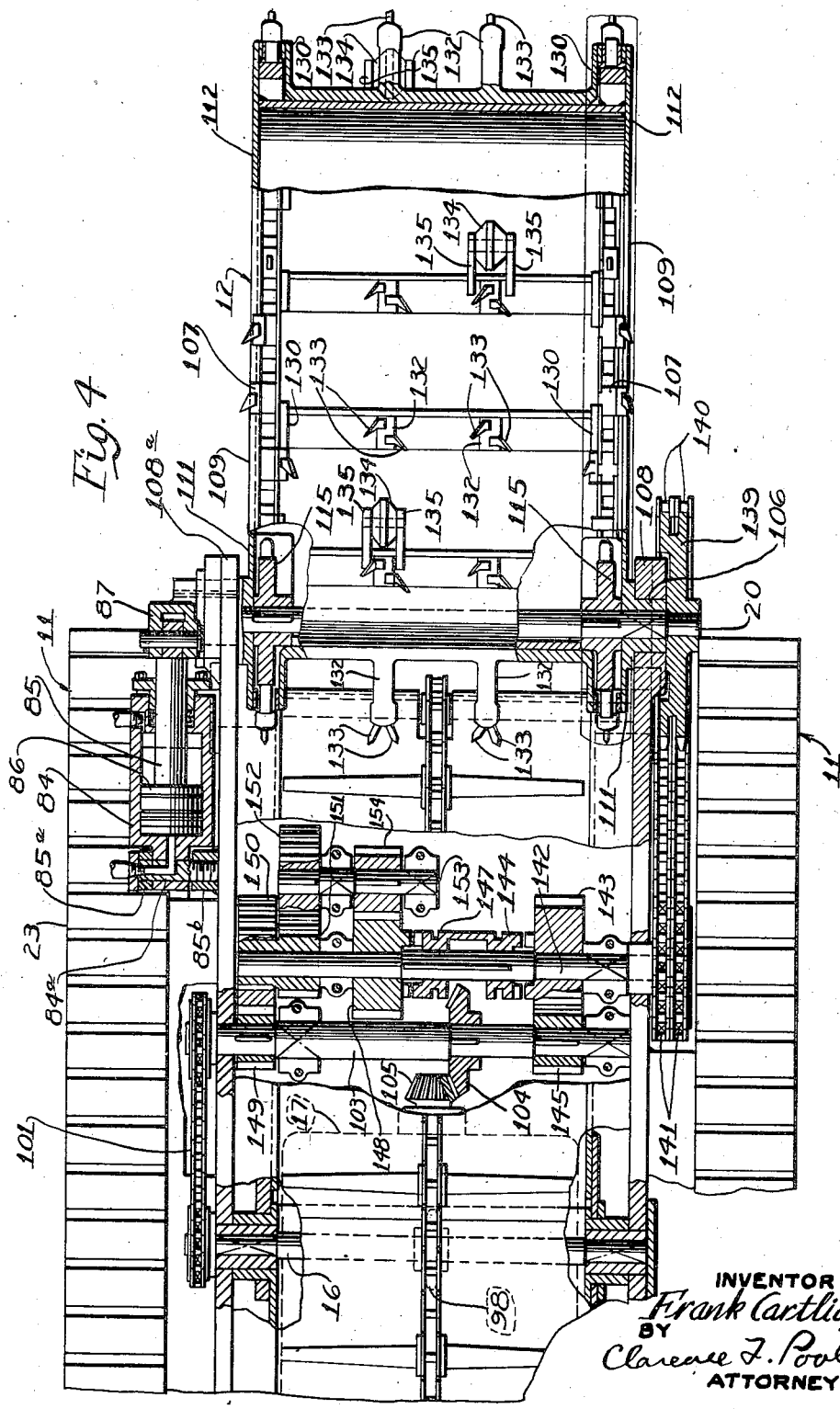

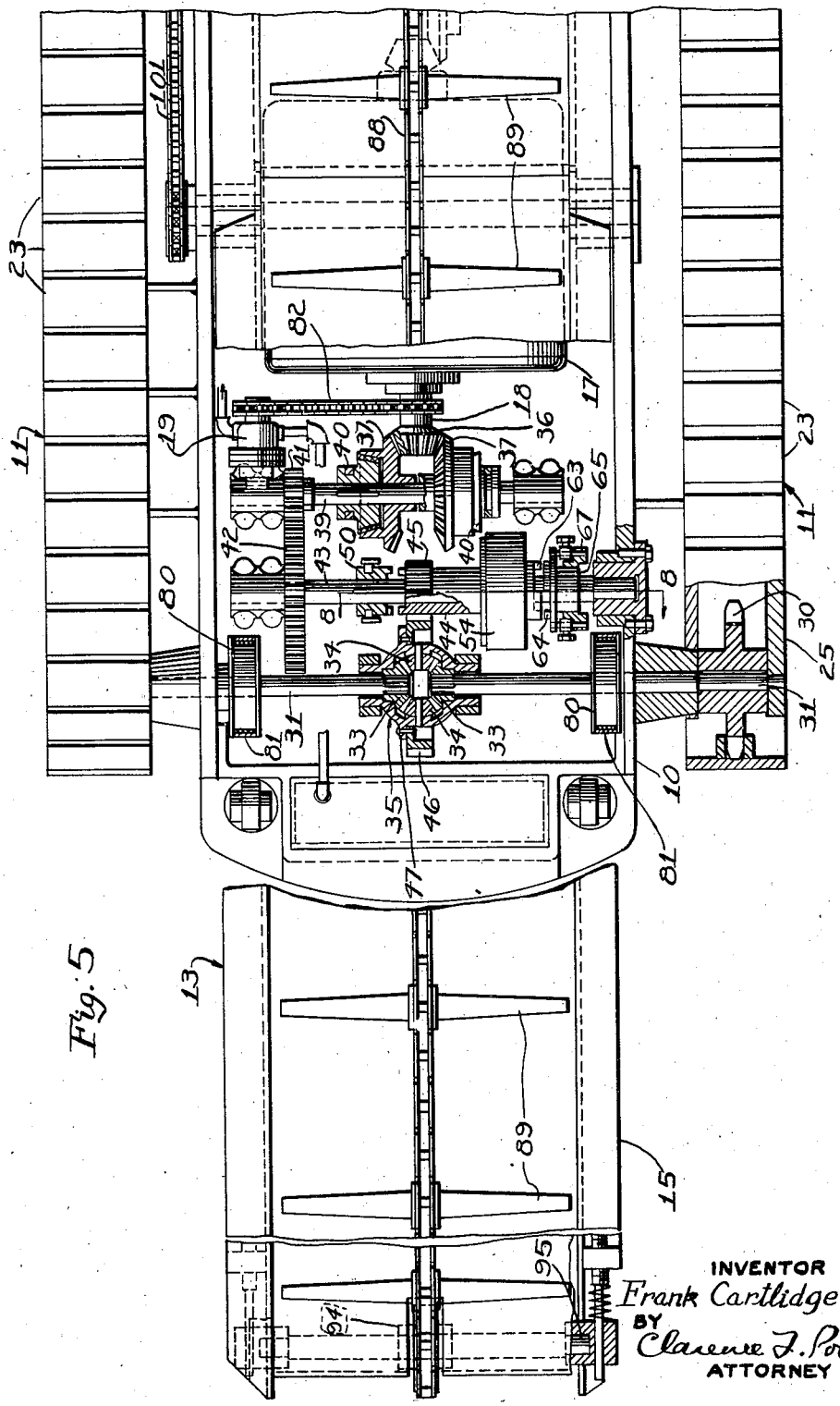

Patented June 23, 1942

2,287,230

UNITED STATES PATENT OFFICE 2,287,230

CUTTING AND LOADING MACHINE

Frank Cartlidge, Chicago, Ill., assignor to Goodman Manufacturing Company, Chicago, Ill., a corporation of Illinois Application January 11, 1941, Serial No. 374,029

12 Claims. (Cl. 262—9)

This invention relates to improvements in cutting and loading machines, and has as its principal objects to provide a new and improved machine of the class described, having a novel form and arrangement of cutting and loading element adapted to completely cut out and load material from the solid, such as coal, in a continuous operation.

A more specific object of my invention is to provide such a machine having a new and improved cutting and loading element including a pair of parallel spaced orbitally guided cutter chains pivoted to move vertically as a unit, and so arranged that the space between said cutter chains may form a trough for collecting the material cut by said cutter chains and transferring it onto a discharge conveyer.

A further object of my invention is to provide a cutting and loading element for a machine of the class described including a pair of parallel spaced cutter chains guided for orbital movement in vertical planes, with flights connecting the cutter chains together, and provided with cutting and breaking members adapted to cut and break down the coal in the space between said cutter chains, and also adapted to form the material moving means of a conveyer, to convey the cut and broken down material away from the cutting and loading element.

Other objects of my invention will appear from time to time as the following specification proceeds and with reference to the accompanying drawings wherein:

Figure 1 is a view in side elevation of a cutting and loading machine constructed in accordance with my invention;

Figures 2 and 3 comprise an enlarged view in side elevation of the machine shown in Figure 1, with certain parts broken away and certain other parts shown in substantially longitudinal section;

Figures 4 and 5 comprise an enlarged plan view of the machine shown in Figure 1, with certain parts broken away and certain other parts shown in substantially horizontal section;

Figure 6 is an enlarged fragmentary transverse sectional view taken substantially along line 6—6 of Figure 1;

Figure 7 is an enlarged fragmentary detail transverse sectional view, showing certain details of the mounting for one of the endless traction treads;

Figure 8 is an enlarged fragmentary sectional view taken substantially along line 8—8 of Figure 5, illustrating certain details of the reduction drive to the traction treads;

Figure 9 is an enlarged detail view showing certain details of the reduction drive to the traction treads, not shown in Figure 8;

Figure 10 is an enlarged transverse sectional view taken substantially along line 10—10 of Figure 2;

Figure 11 is an enlarged detail horizontal sectional view taken through one of the cutter chains and bars; and Figure 12 is an enlarged detail transverse sectional view showing certain details of the drive to the cutting mechanism.

With reference now in particular to the drawings, the embodiment of my invention illustrated therein includes generally a main frame 10 mounted on a pair of laterally spaced continuous tread devices 11, 11. A cutting and loading element 12 is transversely pivoted to the forward end of said main frame, for pivotal movement about the axis of a transverse drive shaft 20, and projects forwardly therefrom, for cutting out and loading material from the solid, such as coal.

The cutting and loading element 12 is adapted to discharge the material cut and broken down thereby into a discharge conveyer 13, extending along said main frame from the lower forward end thereof and having a forward inclined portion 14 and a rear discharge portion 15, mounted for vertical movement about a transverse drive shaft 16, for the conveyer, for adjustment to load into cars of varying heights.

A motor 17 is mounted on said main frame. Said motor is provided with a longitudinally extending armature shaft 18. Drive connections are provided from the forward end of said motor, for driving said cutting and loading element and said discharge conveyer. Other drive connections are provided from the rear end of said motor, for driving said continuous traction tread devices and a fluid pump 19, for supplying fluid under pressure to certain operating parts of the machine.

The continuous tread devices 11, 11 are of a usual construction, so need not herein be described in detail, and include a plurality of traction treads 23, 23 pivotally connected together in a usual manner, to form a continuous chain. Said continuous tread devices are guided for movement along the upper sides of laterally spaced tread guiding shoes 24, 24, extending along the upper sides of tread supporting and guiding portions 25, 25, projecting laterally from opposite sides of said main frame (see Figures 1 and 7). Spaced rollers 26, 26 are mounted in said tread supporting and guiding portions of said main frame, and engage the upper sides of the lower run of said continuous tread devices and form a support for said main frame on said tread devices. Each of said tread devices passes around suitable idler rollers 29 mounted at the forward end of said tread guiding portion of said main frame, and passes around and is driven from a drive sprocket 30 mounted in said tread guiding portion of said main frame, adjacent the rear end thereof (see Figures 1 and 5). Each of said drive sprockets is keyed to the outer end of a transversely extending shaft 31, journaled in said main frame. Said shafts are driven from coaxial bevel pinions 33, 33, mounted on the inner ends of said shafts. Said bevel pinions mesh with bevel pinions 34, 34 forming a part of a differential drive generally indicated by reference character 35.

The drive from the motor 17 to the differential 35 and continuous tread devices 11, 11 includes a bevel pinion 36, keyed to the rear end of the armature shaft 18 and meshing with a pair of facing bevel gears 37, 37, freely mounted on a transversely extending shaft 39. Clutches 40, 40, herein shown as being friction cone clutches, are provided to connect either of said bevel gears to said transversely extending shaft, for driving said shaft in reverse directions without reversal of said motor. Said clutches are interconnected in a suitable manner (not shown), to prevent the driving of said shaft from more than one bevel gear at a time. A spur pinion 41 is keyed to the transverse shaft 39 and meshes with and drives a spur gear 42 on a transverse shaft 43, for driving said shaft. A sleeve 44 is freely mounted on said shaft and a spur pinion 45 is herein shown as being formed integral therewith. Said spur pinion meshes with a spur ring gear 46, secured to a casing 47 of the differential 35, for driving said casing and the bevel pinions 33, 33 through the bevel pinions 34, 34, in the usual manner. The spur pinion 45 is selectively connected with the transverse shaft 43, for driving said differential and the shafts 31, 31 at a high rate of speed, by means of a clutch member 50, herein shown as being a usual form of jaw clutch member.

The end of the sleeve 44 opposite from the spur pinion 45 is herein shown as having an internal gear 53 of a planetary geared reduction device 54 formed integrally therewith, which may drive said sleeve and the pinion 45 at a relatively low speed when the jaw clutch member 50 is disconnected therefrom (see Figure 8). Said internal gear 53 is meshed with planetary pinions 55, 55, mounted in a cage 56, freely rotatable with respect to said sleeve. Planetary pinions 57, 57 are herein shown as being formed integral with the planetary pinions 55, 55 and mesh with an internal gear 59, herein shown as being formed integral with a casing 60 of said planetary. Said casing, with the internal gear 53, forms a housing for enclosing said planetary geared reduction device. The casing 60 is journaled on its hub on a sleeve 61, which is keyed to the transverse shaft 43. Said sleeve extends within said casing 60 and, as herein shown, has a sun gear 62 formed integral therewith, which meshes with the planetary pinions 57, 57 for driving said planetary pinions (see Figure 8). Jaws 63, 63 are provided on the outer end of the hub of the casing 60, which are adapted to be engaged by jaws 64, 64 on a holding member 65, slidably mounted on the sleeve 61 but held from rotation with respect thereto, to form a means for holding said casing and the internal gear 59 from rotation, so said internal gear may form a reaction member for said planetary.

The holding member 65, as herein shown, has splines or teeth 66 cut in the outer periphery thereof, which are slidably engaged with internal splines formed in a stationary frame member 67, for holding said clutch member from rotation. A flange 69 projects outwardly from the inner end of said holding member and has outwardly extending horizontal rods 70, 70 secured thereto. Said rods extend through a shifting collar 71 and are secured thereto, and are slidably mounted in the frame member 67 (see Figure 9). Said shifting collar and holding member are shifted to engage the jaws 64 with the jaws 63, and vice versa, by means of a clutch yoke 72 pivotally connected with said shifting collar and mounted on a longitudinally extending rock shaft 73. An arm 74 is mounted on said rock shaft for rocking said shaft, and projects upwardly therefrom. Said arm is connected with an arm 75, mounted on a rock shaft 76, by means of a link 77 (see Figure 8). Said last named rock shaft has a yoke 79 secured thereto, for shifting the clutch member 50. It is thus obvious that when the clutch member 50 is shifted to an engaged position, the jaws 64 will be disengaged from the jaws 63; and when the casing 60 is held from rotation by means of the jaws 64, the clutch member 50 will be in a disengaged position. The transverse shafts 31, 31 and continuous tread devices 11, 11 may thus be reversely driven at either a high tramming speed of a low feeding speed through the motor 17 and the differential 35, without reversal of said motor.

Each shaft 31 is provided with a brake drum 80 adapted to be engaged by a friction band 81, to hold said associated shaft from rotation (see Figure 5). Thus when it is desired to turn the machine in one direction or another, one friction band 81 may be applied to one brake drum 80, for holding the associated continuous tread from movement and permitting the machine to turn about this tread, and when it is desired that the machine travel in a straight line, both friction bands may be disengaged from their associated brake drums.

The pump 19 for supplying fluid under pressure to the fluid pressure actuated parts of the machine is driven from the rear end of the armature shaft 18 by means of a chain and sprocket drive generally indicated by reference character 82. Said pump is adapted to supply fluid under pressure to a pair of laterally spaced vertical cylinders 83, 83, for elevating or lowering the discharge end 15 of the discharge conveyer 13 about the axis of the shaft 16, in an obvious manner. Said pump is also adapted to supply fluid under pressure to the head or piston rod ends of a cylinder 84, for elevating or lowering the cutting and loading element 12 about the axis of the shaft 20, in a manner which will hereinafter more clearly appear as this specification proceeds.

The discharge conveyer 13, as herein shown, includes a center strand endless chain 88, having spaced flights 89, 89 connected thereto at suitable intervals and projecting laterally from opposite sides thereof. Said chain extends around an idler roller 90, mounted on a transverse shaft 91, at the lower forward end of the main frame 10 (see Figures 2 and 6). From thence it extends upwardly along an inclined bottom plate 92, and along a plate 93 of the rear discharge portion 15 of said conveyer (see Figure 3). At the rear end of said last mentioned bottom plate, said endless chain extends around an idler roller 94 on a transverse shaft 95, and forwardly from said shaft along the underside of said bottom plate. The lower run of said endless chain is slidably supported on the top of a plate 96, which terminates just rearwardly of an idler roller 97. Said chain extends over said idler roller, under a sprocket 98 keyed on the transverse shaft 16, and over an idler roller 99, disposed forwardly of said sprocket. From thence said chain extends along the upper side of an inclined plate 100, to and around the idler roller 90.

The drive from the motor 17 to said conveyer includes a chain and sprocket drive generally indicated by reference character 101, driven from a transverse shaft 103. Said transverse shaft is suitably journaled in the main frame 10 and is driven from the forward end of the motor 17 by means of a bevel gear 104 keyed on said shaft and driven from a bevel armature pinion 105.

Referring now in particular to the details of the cutting and loading element 12 and certain novel features of my invention, said cutting and loading element includes a pair of laterally spaced cutter chains 107, 107, guided for orbital movement in a pair of parallel spaced vertical planes in a pair of interconnected guide or cutter bars 109, 109. Said cutter bars, as herein shown, each include a rear guide plate 111 and a forward outer guide plate 112 mounted for adjustment towards and from said rear guide plate, to adjust the tension of the cutter chain.

The rear guide plate 111, on the side of the machine which is its right hand side when looking towards the forward end thereof, is provided with a hub 106 pivotally mounted in a side frame member 108 of the main frame 10 and journaled on the shaft 20, adjacent one end thereof (see Figure 4). The opposite rear guide plate is provided with a hub 110 journaled on the shaft 20 adjacent the opposite end thereof (see Figure 12). A hub 87a of an arm 87 is pivotally mounted in a side frame member 108a of the main frame 10 and is keyed to said hub 110 (see Figure 12). The free end of said arm is pivotally connected to a piston rod 85 extending from a piston 86 mounted in the cylinder 84, for elevating or lowering said cutting and loading element about the axis of the shaft 20.

The rear guide plates 111, 111 are connected together by means of a plate 121 formed in the shape of a U and extending around the shaft 20 and forwardly therefrom. Said plate 121 is secured at its opposite sides to the guide plates 111, 111 and extends therealong beyond the forward ends thereof. The open ends of said U-shaped plate are adapted to abut the open ends of a U-shaped plate 119, secured at its opposite sides to the insides of the guide plates 112, 112. The upper surfaces of the U-shaped plates 119 and 121 form a trough bottom along which the broken down material may be carried by flights 120, 120, connected between said cutter chains.

The guide plates 112, 112 each have a bar 113 secured to the inner side thereof. Said bars are curved to the form of the U-shaped plate 119 and are spaced outwardly therefrom and their outer surfaces form shoes along which the cutter chains 107, 107 ride. The open ends of said bars extend rearwardly beyond the rear ends of said plates 112, 112 along the forward portions of the rear guide plates 111, 111, and terminate adjacent cutter chain drive sprockets 115, 115. A gib 117 is secured to the inner side of the forward plate 112 and extends around the periphery thereof, to form a guide for retaining the cutter chain 107 in said cutter bar.

The rear end of the member 119 is closed by means of a transversely extending guide member 126 which has a rearwardly projecting reduced portion 126a having guiding engagement with bearing plates 127, 127, mounted on the inner sides of the open portion of the member 121 (see Figure 2). Thus the two cutter bars, connected together by the facing U-shaped members 119 and 121, form a trough along which material broken down from the coal face may be conveyed by the flights 120, 120, and discharged into the receiving end of the discharge conveyer 13.

The forward and rear parts of the cutter bars 109, 109 are adjustably connected together, to adjust the tension of the cutter chains 107, 107, by means of adjusting screws 122, 122. Each of said adjusting screws is mounted in an open portion 123 of the plate 112 and is threaded through a block 124, mounted in said open portion, and has threaded engagement with a block 125, extending inwardly from the plate 111 (see Figure 1).

The flights 120, 120 are each provided with upright outer ends 130, 130, which are connected to certain links of the cutter chain by means of rivets 131, 131, as illustrated in Figure 11. Said flights likewise have a plurality of spaced outwardly projecting cutter arms 132, 132, spaced inwardly from the upright outer ends 130, 130. Each of said arms is herein shown as having a pair of cutter bits 133, 133 detachably mounted therein.

Each flight 120, as herein shown, also has a wedge-shaped breaking down roller 134 mounted between a pair of rearwardly projecting arms 135, 135, which are inclined upwardly from the lower portion of said flight, when said flight is moving along the top side of the plate 119. Said rollers on said flights are adapted to engage the kerf cut by the bits 133, 133, as said arms round the forward end of said plates, to wedge and break down the coal onto said plate.

The cutting and loading element is fed vertically into the coal by means of the elevating cylinder 84, piston 86 and piston rod 85 pivotally connected with the free end of the arm 87. Said elevating cylinder is transversely pivoted to the outer side of the side frame member 108a by means of a pivotal pin 84a extending through a bracket 85a and threaded at its inner end in a boss 85b, projecting outwardly from the side frame member 108a and secured thereto. Since the arm 87 is journaled in the side frame member 108a and is keyed to the hub 110 of the rear guide plate 111, the admission of fluid under pressure to the piston rod end of said cylinder will pivot said arm and the cutting and loading element about the axis of the transverse shaft 20. The fluid connections and controls from said pump to said cylinders are not herein shown or described in detail, since they are no part of my present invention.

It may be seen from the foregoing that the flights 120, 120, besides conveying the material cut and broken down by the cutter chains 107, 107, along the trough-like section formed by the upper sides of the cutter bars 109, 109 and U-shaped plates 119 and 121, likewise serve to cut kerfs in the coal and break down the coal between said cutter chains onto said trough-like section, for discharge onto the receiving end of the discharge conveyer 13. It may further be seen that when said cutting mechanism has been fed into the coal to the required depth, that pivotal movement of said cutting and loading element about the axis of the shaft 20, in an upward direction, effected by the cylinder 84 and piston 86, connected to the arm 87, will cause said cutting and loading element to cut out a complete vertical section in the coal face, the cutting and loading operation being completed by feeding the frame in a rearward direction away from the coal face, when the forward ends of said cutter bars have been fed upwardly to the required height.

The means for driving the cutter chains 107, 107 about the cutter bars 109, 109 includes a sprocket 139 mounted on one outer end of the transverse shaft 20. As herein shown, said sprocket is provided with two sets of laterally spaced teeth adapted to be meshed with laterally spaced drive chains 140, 140. Said drive chains are driven from a sprocket 141 on a transverse shaft 142, journaled in the main frame 10. A spur gear 143 is freely mounted on said shaft and is adapted to be selectively connected thereto, for driving said shaft at a relatively high rate of speed, by means of a jaw clutch member 144. Said spur gear is meshed with and driven from a spur pinion 145, keyed on the transverse shaft 103.

The low speed drive to the sprocket 141 and cutter chains 107, 107 includes a jaw clutch member 147, feathered on the transverse shaft 142 and adapted to operatively connect a spur gear 148 with said shaft. Said jaw clutch member is herein shown as being formed integrally with the jaw clutch member 144, so that neither of said jaw clutch members can be in an engaged position at the same time. The geared connection from the shaft 103 to said spur gear includes a spur pinion 149 keyed on the shaft 103, adjacent the end thereof opposite from the spur pinion 145 and meshing with a spur gear 150, keyed on a hub of a spur pinion 151, which spur pinion is freely mounted on the transverse shaft 142. Said spur pinion meshes with a spur gear 152 keyed on a jack shaft 153. A spur pinion 154 is keyed on said jack shaft and meshes with and drives the spur gear 148. Thus the cutter chains 107, 107 may be driven at a relatively high rate of speed, when being sumped into the coal in an endwise direction and may be driven at a slow rate of speed when being fed vertically along the coal face, after having been sumped therein to the required distance. This improved form of drive facilitates the cutting and loading operation and permits a relatively high sumping speed, where only a small portion of the bits are in contact with the coal at a time, and provides a slow cutting speed where the bits for the entire length of the bar may be in contact with the coal during vertical feeding movement of the bar.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a cutting and loading machine, a pair of spaced apart cutter chains guided for orbital movement in parallel spaced vertical planes, a plate disposed between said cutter chains, and material carrying flights connected between said chains and movable along said plate to form a conveying means for conveying the material cut by said chains.

2. In a cutting and loading machine, a pair of spaced apart cutter chains guided for orbital movement in parallel spaced vertical planes, a plate disposed between said cutter chains, and material carrying flights connected between said chains and movable along said plate to form a conveying means for conveying the material cut by said chains, said flights being provided with outwardly projecting cutter arms for cutting and breaking down the material between said cutter chains.

3. In a cutting and loading machine, a pair of spaced apart cutter chains guided for orbital movement in parallel spaced vertical planes, and material carrying flights connected between said chains and forming a conveying means for conveying the material cut by said chains, said flights being provided with outwardly projecting cutter arms, for cutting and breaking down the material between said cutter chains, and breaking members disposed rearwardly of and mounted on said flights, for entering the kerf cut by said cutter arms and breaking down the material onto said flights.

4. In a cutting and loading machine, a pair of spaced apart cutter chains guided for orbital movement in parallel spaced vertical planes, and material carrying flights connected between said chains and forming a conveying means for conveying the material cut by said chains, said flights being provided with outwardly projecting cutter arms for cutting and breaking down the material between said cutter chains, and breaking members disposed rearwardly of and secured to said flights for entering the kerfs cut by said cutter arms and breaking down the material onto said flights, said breaking members including rotatable wheels having V-shaped engaging faces.

5. In a cutting and loading machine, a frame, a pair of parallel spaced cutter bars pivoted to said frame a their rear ends for vertical movement with respect thereto, cutter chains guided for orbital movement about said cutter bars, a bottom plate connecting said bars together, and spaced flights connected at their ends to said cutter chains and movable along said plate, said flights having arms extending outwardly therefrom, for cutting and breaking down the material between said cutter bars.

6. In a cutting and loading machine, a frame, a pair of parallel spaced cutter bars pivotally mounted on said frame at their rear ends, for vertical movement with respect thereto, cutter chains guided for orbital movement about said cutter bars, a bottom plate connecting said bars together and spaced beneath said chains a substantial distance, to form a trough in the space between said cutter bars, and spaced apart flights movable along said bottom plate and having connection with said cutter chains at their ends.

7. In a cutting and loading machine, a frame, a pair of parallel spaced cutter bars pivoted to said frame at their rear ends for vertical movement with respect thereto, cutter chains guided for orbital movement about said cutter bars, a bottom plate connecting said bars together and spaced beneath said chains a substantial distance, to form a trough in the space between said cutter bars, spaced apart flights movable along said bottom plate and having connection with said cutter chains at their ends, and cutter arms projecting outwardly from said flights, for cutting and breaking down the coal in the space between said cutter bars.

8. In a cutting and loading machine, a frame, a pair of parallel spaced cutter bars transversely pivoted to said frame at their rear ends, for vertical movement with respect thereto, cutter chains guided for orbital movement about said cutter bars, a bottom plate connecting said bars together and spaced beneath said chains a substantial distance, to form a trough in the space between said cutter bars, spaced apart flights having connection with said cutter chains at their ends and movable along said bottom plate, cutter arms projecting outwardly from said flights, for cutting the coal in the space between said cutter bars, and breaker wheels connected to said flights and disposed rearwardly thereof, said breaker wheels being adapted to extend into the inner portion of the kerf cut by said cutter arms, for breaking down the material cut by said cutter arms.

9. In a cutting and loading machine, a frame mounted for movement along the ground, a conveyer extending rearwardly along said frame, a pair of parallel spaced cutter bars transversely pivoted to the forward end of said frame at a point spaced above said conveyer, cutter chains guided for orbital movement about said cutter bars in a pair of parallel spaced vertical planes, means for sumping said cutter bars into the material it is desired to cut and load, means for vertically moving said cutter bars about said transverse pivotal axis for cutting out a section in the mine wall, a bottom plate spaced beneath the upper run of said cutter chains and forming a trough between said cutter bars, and flights connected with and moved by said cutter chains along said plate, for transferring material from the working place to said conveyer.

10. In a cutting and loading machine, a frame mounted for movement along the ground, a conveyer extending rearwardly along said frame, a pair of parallel spaced cutter bars transversely pivoted to the forward end of said frame at a point spaced above said conveyer, cutter chains guided for orbital movement about said cutter bars in parallel spaced vertical planes, means for sumping said cutter bars into the material it is desired to cut and load, means for vertically moving said cutter bars about said transverse pivotal axis, to cause said cutter chains to cut a pair of spaced apart kerfs in the mine wall, a bottom plate spaced beneath said cutter bars and connecting said cutter bars together, to form a trough between said cutter bars, and a plurality of longitudinally spaced flights movable along said bottom plate, said flights having upwardly extending ends having connection with said cutter chains, so said cutter chains and flights may move material broken down by said cutter chains along said bottom plate.

11. In a cutting and loading machine, a frame mounted for movement along the ground, a conveyer extending rearwardly along said frame, a pair of parallel spaced cutter bars transversely pivoted to the forward end of said frame at a point spaced above said conveyer, cutter chains guided for orbital movement about said cutter bars in a plurality of parallel spaced vertical planes, means for sumping said cutter bars into the material it is desired to cut and load, means for vertically moving said cutter bars about said transverse pivotal axis to cause said cutter chains to cut a pair of parallel spaced kerfs in the mine wall, a bottom plate spaced beneath said cutter bars and connecting said cutter bars together to form a trough between said cutter bars, longitudinally spaced flights movable along said bottom plate, said flights having upwardly extending ends having connection with said cutter chains, and said flights being moved along said bottom plate by said cutter chains and having laterally spaced cutter arms projecting upwardly therefrom intermediate the ends thereof.

12. In a cutting and loading machine, a frame mounted for movement along the ground, a conveyer extending rearwardly along said frame, a pair of parallel spaced cutter bars transversely pivoted to the forward end of said frame at a point space above said conveyer, cutter chains guided for orbital movement about said cutter bars in parallel spaced vertical planes, means for sumping said cutter bars into the material it is desired to cut and load, and means for vertically moving said cutter bars about said transverse pivotal axis, for cutting out a section in the mine wall, a bottom plate spaced beneath said cutter bars and connecting said cutter bars together, to form a trough between said cutter bars, longitudinally spaced flights movable along said bottom plate, said flights having upwardly extending ends having connection with said cutter chains and being moved along said bottom plate by said cutter chains and having laterally spaced cutter arms projecting upwardly therefrom intermediate the ends thereof, and breaker wheels mounted on said flights and spaced rearwardly therefrom and adapted to enter the kerf cut by said cutter arms as said flights turn about the forward end of said bottom plate.

FRANK CARTLIDGE.